United States Patent
Sampson

Patent Number: 5,674,089
Date of Patent: Oct. 7, 1997

[54] ENVIRONMENTAL PROTECTION DEVICE MANUALLY OPERATED LATCH MECHANISM

[75] Inventor: Jeff Sampson, Redwood City, Calif.

[73] Assignee: Raychem Corporation, Menlo Park, Calif.

[21] Appl. No.: 434,622

[22] Filed: May 4, 1995

Related U.S. Application Data

[63] Continuation-in-part of Ser. No. 252,016, Jun. 1, 1994, Pat. No. 5,525,073.

[51] Int. Cl.$^6$ .................................................... H01R 13/52
[52] U.S. Cl. ........................................... 439/521; 439/936
[58] Field of Search ................................. 439/521, 519, 439/201, 202, 204, 357, 358, 936; 174/76, 138 F

[56] References Cited

U.S. PATENT DOCUMENTS

| | | | |
|---|---|---|---|
| 3,325,591 | 6/1967 | Wahl | 174/138 |
| 3,757,031 | 9/1973 | Izraeli | 174/138 F |
| 3,923,362 | 12/1975 | Dunn et al. | 339/96 |
| 4,210,380 | 7/1980 | Brzostek | 339/107 |
| 4,369,284 | 1/1983 | Chen | 524/476 |
| 4,410,226 | 10/1983 | Adduci et al. | 339/44 R |
| 4,451,696 | 5/1984 | Beinhaur | 174/92 |
| 4,595,635 | 6/1986 | Dubrow et al. | 428/447 |
| 4,600,261 | 7/1986 | Debbaut | 339/116 C |
| 4,610,738 | 9/1986 | Jervis | 156/49 |
| 4,634,207 | 1/1987 | Debbaut | 339/116 C |
| 4,643,505 | 2/1987 | House et al. | 339/75 P |
| 4,704,499 | 11/1987 | Faust | 174/92 |
| 4,716,183 | 12/1987 | Gamarra et al. | 522/80 |
| 4,777,063 | 10/1988 | Dubrow et al. | 427/44 |
| 4,859,809 | 8/1989 | Jervis | 174/92 |
| 4,909,756 | 3/1990 | Jervis | 439/521 |
| 4,942,270 | 7/1990 | Gamarra | 174/93 |
| 4,998,894 | 3/1991 | Gronvall | 439/521 |
| 5,079,300 | 1/1992 | Dubrow et al. | 525/106 |
| 5,080,606 | 1/1992 | Burkard | 439/403 |
| 5,107,077 | 4/1992 | Fox et al. | 174/138 F |
| 5,129,839 | 7/1992 | VanSkiver | 439/367 |
| 5,135,409 | 8/1992 | Thompson | 439/367 |
| 5,147,217 | 9/1992 | Neal, III et al. | 439/403 |
| 5,229,058 | 7/1993 | Uken et al. | 264/261 |
| 5,286,516 | 2/1994 | Uken | 427/58 |
| 5,368,501 | 11/1994 | Asbell | 439/418 |

FOREIGN PATENT DOCUMENTS

| | | | |
|---|---|---|---|
| 0 196 219 | 10/1986 | European Pat. Off. | C23F 11/00 |
| 0 244 657 A1 | 11/1987 | European Pat. Off. | H02R 4/70 |
| 0 328 386 | 8/1989 | European Pat. Off. | H01R 13/52 |
| 0 589 410 A3 | 5/1994 | European Pat. Off. | H02G 15/18 |
| 2 545 285 | 11/1984 | France | H01R 13/506 |
| 1 947 057 | 9/1968 | Germany . | |
| 2 030 073 | 9/1969 | Germany . | |
| 7540922 | 4/1976 | Germany | H02G 15/113 |
| 33 45 932 A1 | 12/1983 | Germany | H02G 15/18 |
| 1 324 176 | 7/1973 | United Kingdom | H02G 15/10 |
| 2 138 639 | 10/1984 | United Kingdom | H01R 13/50 |
| 2 273 610 | 6/1994 | United Kingdom | H01R 13/506 |
| WO 89/10648 | 11/1989 | WIPO | H02G 15/10 |
| WO 92/22116 | 12/1992 | WIPO | H02G 15/18 |

*Primary Examiner*—Khiem Nguyen
*Attorney, Agent, or Firm*—Herbert G. Burkard

[57] ABSTRACT

An environmental protection device with manually operated latching mechanism is described. The device includes a rigid hook and a latch and bracing member on opposite peripheral edges of the device with cavity halves therebetween capable of fitting together upon the latching of the hook and latch to form an enclosure around a substrate such as a coaxial cable splice or a cable to tap port connection or an automotive wire tab termination upon the closing of the device and the locking of the latch and hook members. The device is preferably filled with a gel sealing material having an elongation of at least 100% and a Voland hardness from about 1 to 50 grams.

13 Claims, 3 Drawing Sheets

ENVIRONMENTAL PROTECTION DEVICE MANUALLY OPERATED LATCH MECHANISM

RELATED APPLICATIONS

This is a continuation-in-part application of U.S. Ser. No. 08/252,016 filed Jun. 1, 1994, now U.S. Pat. No. 5,525,073 the specification of which is completely incorporated herein by reference for all purposes.

TECHNICAL FIELD OF THE INVENTION

This invention relates to environmental sealing and protection devices. More specifically, this invention relates to hinged sealant filled environmental sealing devices. In particular, this invention relates to gel filled environmental sealing closures for coaxial cables splices and/or cable connector to radio frequency source tap ports, and the like.

BACKGROUND OF THE INVENTION

When an elongate substrate such as a coaxial or telephone or electrical cable is spliced or otherwise terminated and connected to a housing or device, it is necessary to protect the cable connectors including the exposed interior conductors, the connector body and the port or splice to which the connector may be attached or the signal will be adversely affected. More specifically, when a coaxial cable is spliced both the exposed interior of the cable and the connection must be protected from moisture ingress to permit a high quality signal to be transmitted across the spice or transferred to the interior of the splitter box or amplifier or extracted from the splitter or the amplifier.

Within the past several years, gel materials such as silicone gels, polyurethane gels, polyurea gels, thermoplastic elastomer gels such as Kraton® or Septon® based polymeric materials and extender oils, and the like have been used to seal elongate substrates. Both of these thermoplastic systems are various configuration of triblock copolymers such as styrene-ethylenebutylene-styrene, styrene-ethylenepropylene-styrene, and mixed midblocked styrene-ethylene-butylene/ethylenepropylene-styrene polymers. The silicones are generally derived from either lightly cross-linked polyorganosiloxane materials and/or extended polyorganosiloxane materials where the extender is generally of lower molecular weight non-reactive silicone such as a silicone oil or fluid. These gels most effectively seal for reentry when the elongate substrate is sealed under compression and not potted by the gel around the substrate. More specifically, the gel is generally cured apart from at least a portion of the substrate and thereafter brought into contact with the complete substrate and in the preferred embodiments, placed under compression to seal the substrate through either a spring or restraining the displaced movement of the gel with an enclosure. Suitable examples reciting gels and/or enclosures are illustrated in U.S. Pat. Nos. 4,610,730; 4,909,756; 4,859,809; 4,600,261; 4,634,207; 4,942,270; 4,639,284; 4,595,635; 4,777,063; 4,716,183; and 4,998,894. The complete disclosures of each of these patents are incorporated herein by reference for all purposes. Optionally, the gel may be fragmented material as taught by U.S. Pat. No. 5,229,058 and/or U.S. Pat. No. 5,286,516, the complete disclosures of which are also incorporated herein by reference for all purposes.

An earlier hinged gel-filled security and environmental protection device was taught in WO 92/22116 (U.S. Ser. No. 07/712,320 filed Jun. 7, 1991 and a CIP thereof Ser. No. 07/988,050 filed Dec. 7, 1992), the disclosures of these applications are completely incorporated herein by reference for all purposes. Although effective, especially for sealing coaxial cable splices, these devices had a tendency to pop open if dropped and/or oversized connectors were inserted into the device. In addition, it was often considered cumbersome to insert a screwdriver or other splitting means to open the device. Thus, it would be highly desirable to have a manually opening device as well as one which has a tendency to remain closed even if the craftsperson selects a slightly oversized connector to be sealed within the unit.

SUMMARY OF THE INVENTION

The invention provides for the previously recited desirable features as well as many other features obvious to the ordinary skilled artisan. In general, the invention is a restrained hook and latch mechanism for an enclosure. More specifically, the device can lock around an elongate substrate such as a coaxial cable splice or over the end of a coaxial cable connector and a splitter or amplifier port to protect the coaxial cable, the connector and device to which it is attached. An alternative embodiment can seal other substrates such as relatively flat substrates like tab automotive wire terminations. The device may be removed by flexing the latching mechanism. The latching mechanism of the invention provides a positive locking latch that holds the device together at higher loads than the previously described WO 92/22116 devices. However, a unique aspect of the locking latch system permits a low mate and release force in comparison to its high holding force so that it can be mated and demated with no tools. Additionally, the design of the preferred device permits two of the units to be put together in a reverse fashion to provide for sealing parallel cables, connectors, splices and automotive tab terminations. In this embodiment of course the hinge between the units is not used due to the planar configuration of the two halves abutting together but a tie-wrap or other member can secure the abutting central hinges, if necessary. Additional embodiments include a device assembled together with a second such device so that the hook member of the second device is in latching engagement with the latch member of the first device and the hook member of the first device is in latching engagement with the latch member of the second device.

DESCRIPTION OF THE PREFERRED EMBODIMENTS

Figure 1:
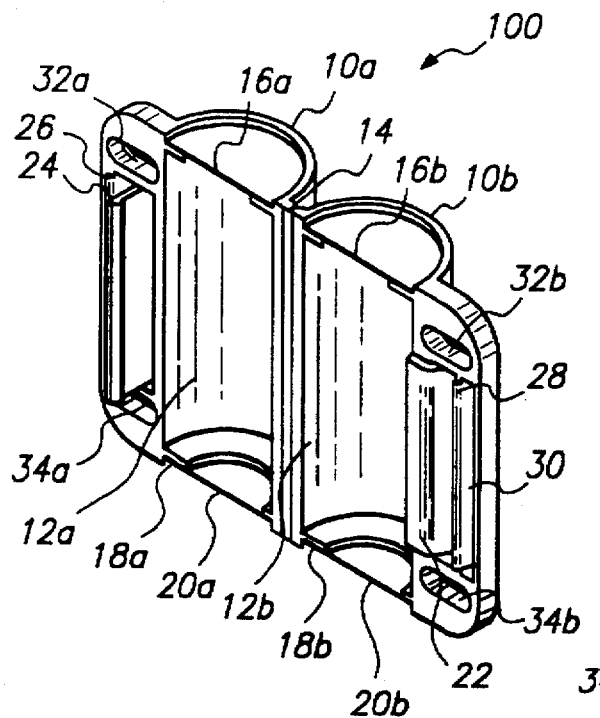
FIG. 1 illustrate an angled perspective view of an embodiment of the invention.

The invention will be described with particular reference to the appended drawings. FIGS. 1-4 should be viewed together to understand the preferred illustrated embodiment of the invention. More specifically, the preferred environmental protection device is illustrated as 100 in each of the figures. All the figures should be viewed together when referring to n particular numbered element for an overall view of the various perspectives and positioning in the preferred described embodiment.

The environmental seal and locking device 100 includes two halves 10a and 10b joined by a living hinge 14 such as a thin piece of the same plastic as halves 10a and 10b to hold the device 100 open during gel filling and curing while permitting the opposed halves 10a and 10b to fold thereabouts to lock into the enclosure about the substrate to be sealed.

Optionally, a breakable web, not illustrated, as taught in WO 92/22116 can be used to assist holding the device open during sealant filling operations. Halves 10a and 10b include compartments 12a and 12b formed by closing the ends of the two halves with thin sections 16a and 16b and 20a and 20b. Each section has a more rigid outer shoulders 18a and 18b and rigid sections opposite thereto for thin sections 16a and 16b. These rigid sections strengthen the overall enclosure. The thin sections 16a and 16b and 20a and 20b collapse and/or stretch upon the closing of the device around a coaxial cable, cable connector or cable tap splice. Suitable materials for the device 100 are polypropylene, nylon, polyethylene and the like or any suitable impact resistant and weather resistant non-corroding material which has hinging properties to the material. Optionally, not illustrated, the hinge 14 can be a standard molded hinge of plastic, metal or other suitable materials rotatable about a central pin member. Under this option, the body material 100 need not have living hinge/flexing properties. The device 100 further includes the main cavity formed upon the closing of the device as illustrated by the preferred semi-circular partial cavities 10a and 10b. The collapsible/stretchable end seals 16a and 16b and 20a and 20b provide ends pieces which restrain the gel upon the filling of the cavity 12a and 12b. A suitable sealing material substantially fills the cavity such as a silicone gel (such as a polyorganosiloxane gel), a polyurea gel, a polyurethane gel or any suitable gel sealing material. Preferred gels have cone penetration perimeters as measured by ASTM-217 of about 100 to 400 ($10^{-1}$ mm) preferably between about 200–350 ($10^{-1}$ mm) an ultimate elongation as measured by ASTMD D-638 of greater than about 100% and preferably greater than about 200% and most preferably greater than about 400% as measured at the higher test speed.

The gels/sealants may also be characterized by a Voland/Stevens texture analyzer. It is preferred that the gel have a hardness of from about 1 to about 50 grams, preferably 5 to about 30 grams and especially 18 to 28 grams having a stress relaxation of between 1 to 55%. Although not believed to be a critical aspect of this environmental closure, the gel has preferably a tack from about 5 to 40 grams and preferably 9 to 35 grams. The hardness, stress relaxation, and tack is measured using a Voland/Stevens texture analyzer model LFRA having a 1,000 gram load cell, a 5 gram trigger, and a 0.25 inch (6.35 mm) ball probe as described in U.S. Pat. No. 5,079,300 (Debrow et. al.) the disclosure of which is incorporated herein by reference. More particularly the hardness is measured using a 20 ml glass scintillating vial containing about 10 to 12 grams of gel. The vial is placed in the analyzer and the stainless steel ball probe is forced into the gel at a speed and 0.20 mm/second to penetrate a distance of 4 mms. The gram force necessary to penetrate 4 mm is the hardness. Higher numbers are harder gels.

More generally, although gel materials within the perimeters previously described are preferred, any suitable sealing material which can wrap around the cable tap port and/or the cable splice and seal out the ingress of moisture is suitable for use in the invention. Gels are preferred because as extended solid systems they do not flow the way greases do upon high temperature thermal cycling.

Particularly preferred materials are gels by Raychem Corporation under having name Gel Tek® gel, tough silicone gel number T894, preferably T854, or a silicone based gel number 612 sold by the Germany Warker or a Dow Corning gel called Sylgard®527.

Alternatively, a thermoplastic elastomer can be used such as a mixture of a Kraton® or Septone® polymer with sufficient plasticizer oil to form a Kraton® or a Septon® based thermoplastic gel. The Kraton® or Septone® gels are polymers of the styrene-ethylene butylene and/or ethylene-propylene-styrene configuration. The gels are from about 3–5% maybe up to 20% polymer and from 80–97% plasticizer oil. The 3–5% polymer percentages extended 95–97% by a napthinic oil are preferred. In the event that the sealing material is a thermoplastic elastomer gel then the collapsible end pieces 16a and 16b and 20a and 20b are optional because the thermoplastic nature of the gel permits the enclosure be filled with the end portions blocked in a mold and upon cooling the gel remains in place. Alternatively, the latch member may be braced and the hook member flexed to release the latching engagement.

Figure 2:
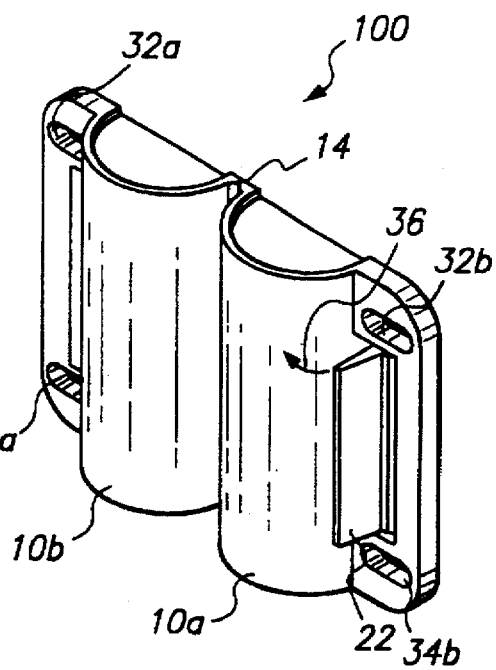
FIG. 2 illustrates an angled perspective view of the opposite side of the embodiment of FIG. 1.
Figure 3:
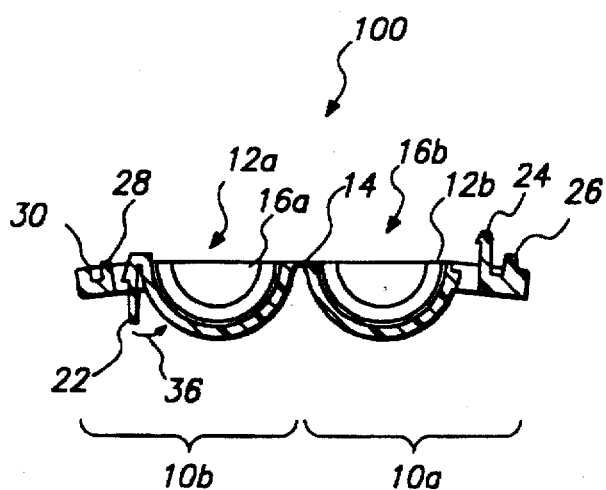
FIG. 3 illustrates a cross-sectional view of the embodiment of the invention in FIGS. 1 and 2 in the open position.
Figure 4:
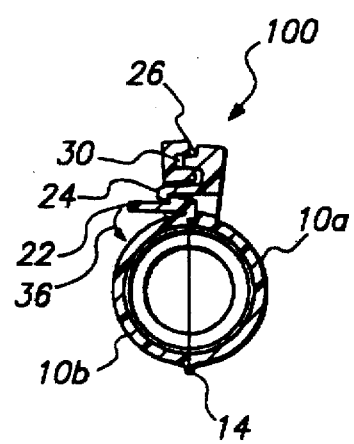
FIG. 4 illustrates a cross-sectional view of the embodiment of the invention illustrated in FIGS. 1, 2, and 3 in the closed position.

The enclosure 100 includes a latch 22 which is the releasing member and a rigid hook 24 with interdigitated raised portion 26 closer to an edge than the hook 24 and a channel 30 on the latch side to receive the ridge 26. The latch side also has a ridge 28 which is received in a channel in the hook side. These ridge and channels restrain movement of the hook and latch in the vertical direction of FIG. 4. The use of a rigid hook 24 and flexible latch 22 which is the opposite of the common mechanical configurations, provides a positive locking latch that holds together at higher loads before releasing. However, the latch has a low mate and release force in comparison to its high holding force so that it can be demated with no tools, i.e. demated by hand. More specially, the latch is sized for an enclosing and RG 59/RG6 connector and will hold loads of up to 20 lbs force while releasing at a force less than 10 lbs. The movement of the latch 22, illustrated by the arrow 36 in FIGS. 2, 3, and 4, provides the hook releasing mechanism. The selection of a plastic with a living hinge property permits the flexing of the latch along its hinge line in a likewise manner to hinge 14. The ridges and channels 26, 28, and 30 interlock to add additional strength and rigidity to the device upon closure as illustrated in FIG. 4.

Optionally, the device includes apertures 32a and 32b and 34a and 34b which upon closing of the device permit the additional adding of tie wraps or like items for an even more positive and firm closing.

A further unique feature of the device is that because of its uniform overall nature two separate halves can be reversed and snapped together to create an enclosure having two cavities if parallel lines of coaxial cables need to be sealed.

The present enclosure provides an even more positive locking mechanism and higher locking forces than described in WO 92/22116 the specification of which is completely incorporated herein by reference for all purposes as well as U.S. application Ser. No. 07/712,320 and 07/988,050 likewise incorporated herein by reference for all purposes.

Figure 5:
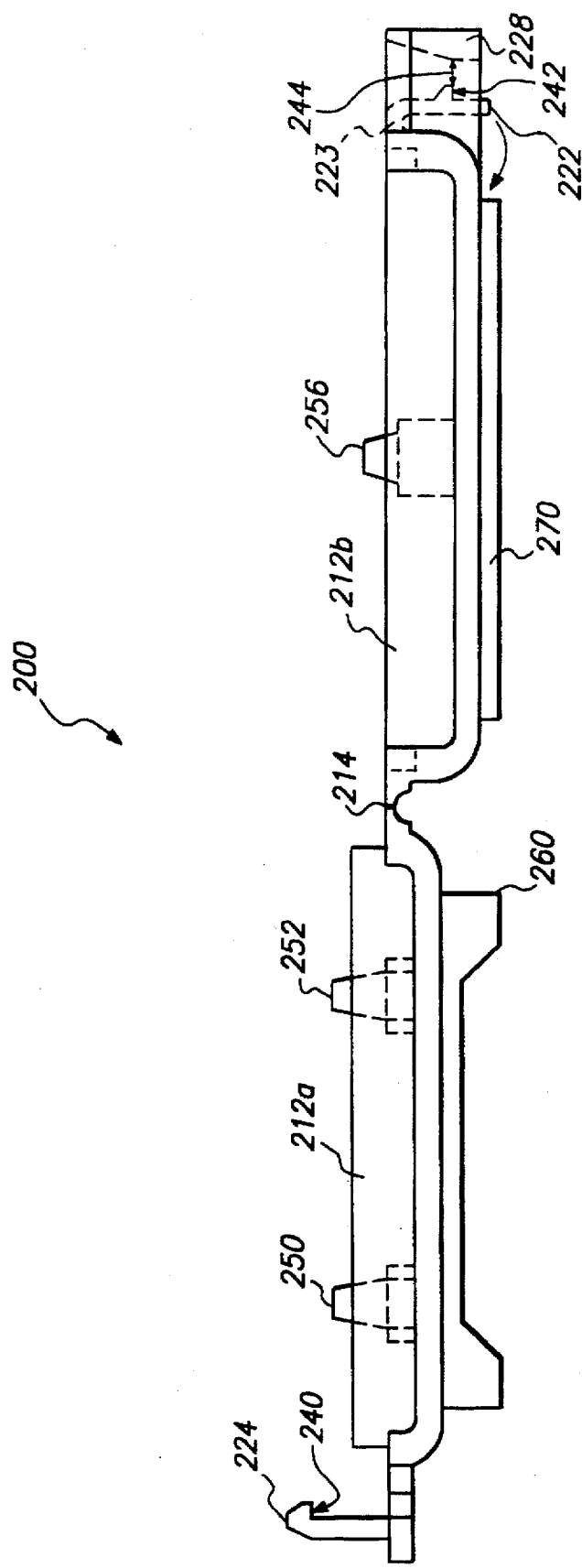
FIG. 5 illustrates a cross sectional view of an alternative embodiment of the invention preferably used with elongate wire tab terminations.
Figure 6:
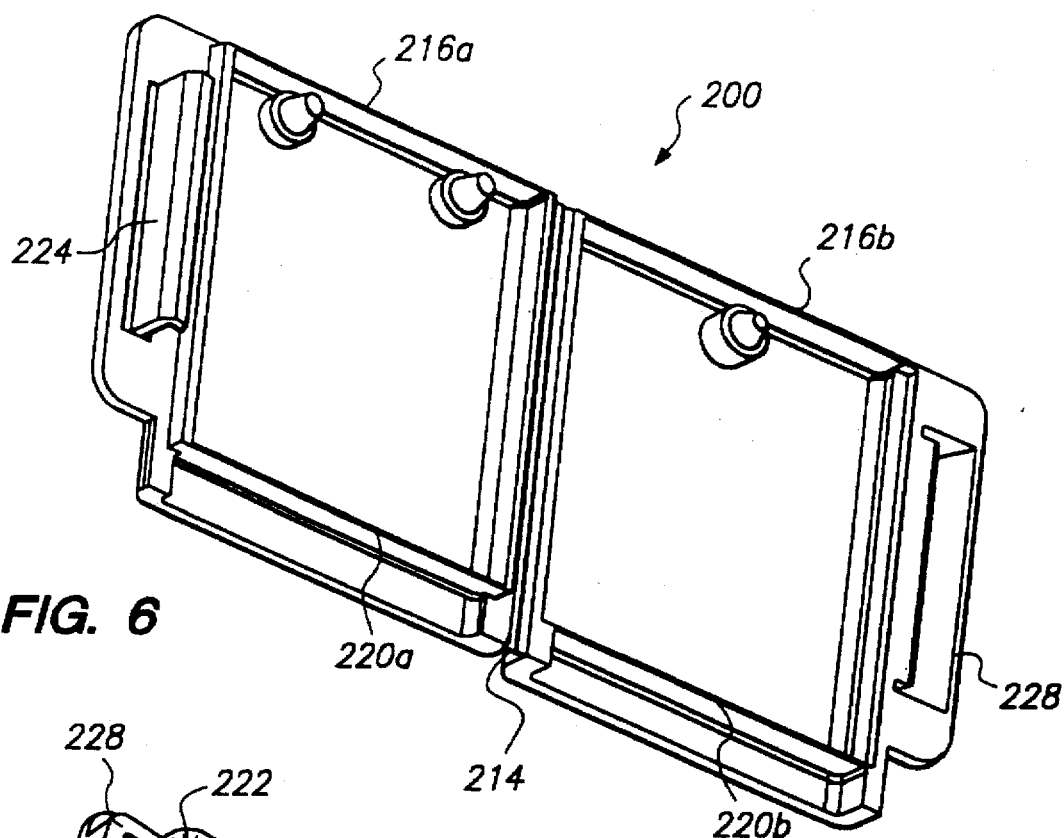
FIG. 6 is an oblique angle view of the cavity portions of the connector of FIG. 5.
Figure 7:
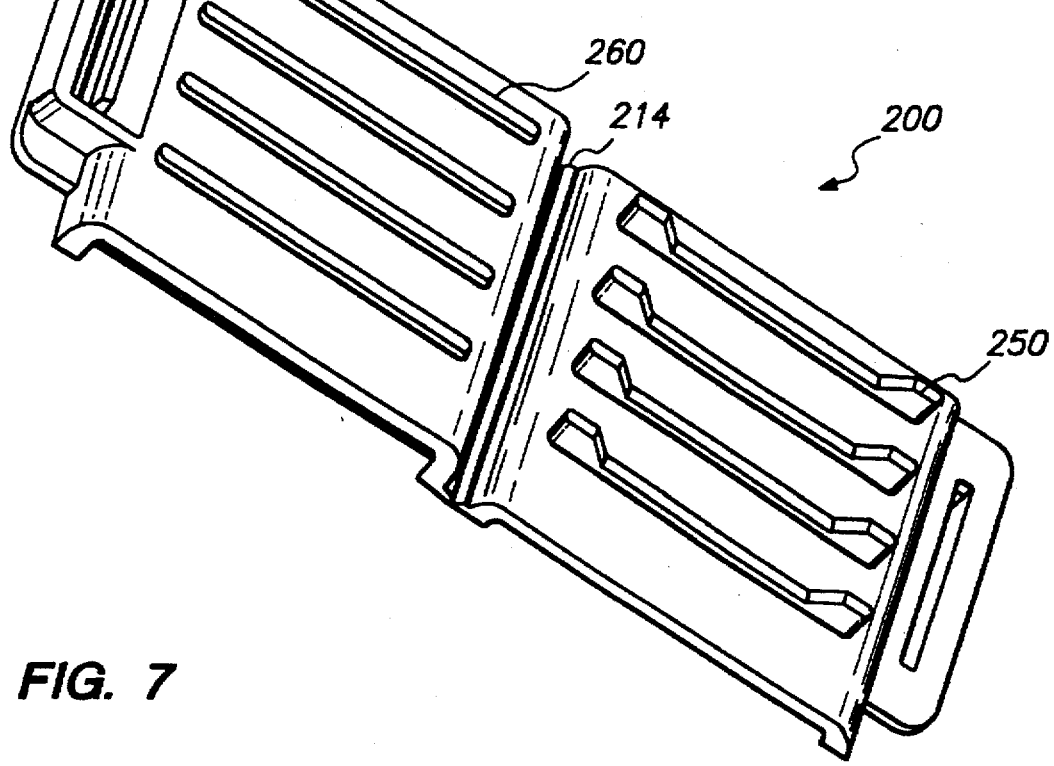
FIG. 7 is a view rotated 180° about the longitudinal central hinging axis of the cavity halves of the device of FIGS. 5 and 6.

Additional preferred embodiments of the invention are illustrated in FIGS. 5, 6, and 7. The features in this alternative embodiment are incorporatable into the preferred embodiment illustrated in FIGS. 1 through 4. More specifically, FIGS. 5–7 illustrate the function of the bracing member such that the preferred rigid hook and flexible latch member can both flex while providing substantially the same higher holding force. Naturally the hook could be rigid in this example as well. Similar elements in FIGS. 5 through 7 are numbered the same last two digits and thus reference should be made to all these figures in conjunction with this preferred embodiment.

In particular, the device 200 is designed to receive a planar substrate such as a plurality of wires onto a metallic tab connector, fitting within the cavity halves 212a and 212b upon the closure of the device about a hinge preferably a plastic living hinge 214. The cavity halves include pin members 250, 252 and 256 to locate the tab wire termination substrate. Optionally, strengthening ribs 270 and feet 260 are used to hold the device open and assist with uniform filling and/or additional structural rigidity of the device. Webbed members 216a, 216b, 220a, and 220b provide dams to create the cavities for filling with the sealant material. These dams should be sufficiently thin that they can break away or flex upon the closing of the cavity halves about the substrate. Of course, if a thermoplastic elastomer system is used and these dams are blocked by a mold during filling then these elements can be dispensed with.

The hook 224 with a ledge 240 fits within the gap 244 formed between the latch 222 with the ledge 242 and the bracing member 228. The latch as the releasing member flexes towards the body about a living hinge such as a plastic living hinge 223. The gap 244 is sized so that there is sufficient overlap between the ledges 240 and 242 such that the gap 244 is insufficient to permit the body halves to spring apart in the absence of a movement of the latch 222 by an outside intervention. In other words, the hook 224 passes through the gap 244 either by flexing or flexing the latch 222 and upon passing therethrough is braced against outward flexure upon torquing or attaching around an oversized substrate by the bracing member 228.

Since the force to open the cavity halves flexes the hook 224 outwards away from the closed body, the bracing member 228 prevents such flexing so that the burst open force is substantially higher than in the absence of the bracing member 228 and permits the extension of the invention to be indifferent to whether the hook 224 is rigid or flexes. Of course, this same bracing member is evident in the embodiment of FIGS. 1–4 but in that preferred embodiment it was chosen to have a rigid hook which lessens the need for the bracing member as the stiffness integrates this function. The bracing member merely further reinforces the particularly preferred embodiment of a rigid hook.

The interior of the semi-circular cavities 16a and 16b may optionally include ribs or be glow discharge treated during manufacture to enhance the affinity of the sealing material to adhere thereto. The roughened surface treatment, EDM texture within the parts optionally also allows for increased surface area and the microscopic undercuts which further improve the gel adhesion to the shell. Although the device has been described with respect to particularly preferred embodiment and sized to use with an RG59/RG6 cables splices and tap ports or wire tab automotive connectors, it can be sized to accommodate any cable connection and/or termination.

Modifications which would be obvious to one of ordinary skill in the art are contemplated to be within the scope of the invention. For example, a closure wherein the first and second body members are separate from each other, the first body member carries a hook member on a peripheral edge portion spaced from that carrying the latch member, and the second body member carries a latch member and a hook bracing member on a peripheral edge portion spaced from that carrying the hook member, the arrangement being such that the respective body members can be latched together by latching engagement of the hook member carried by each with the latch member carried by the other. Additionally the hook and latch/bracing member can be used to join any two substrates or members together such as a fence, and the like.

Thus, it will be obvious to those skilled in the art that various modifications may be made without departing from the spirit of the invention. With the foregoing in mind, it is understood that the invention be accorded the full scope of the appended claims, including all equivalents.

What is claimed is:

1. An environmental protection device for a substrate passing therethrough and/or thereinto, the said device comprising:

a hinged body which includes a longitudinal latch member and a hook bracing member spaced therefrom by a sufficient gap to accept a hook therebetween, said latch and bracing members adjacent and extending along a peripheral edge and a hook member on an opposite peripheral edge of the device, first and second cavity halves therebetween capable of forming a cavity to enclose around a substrate upon the closing of the device and the latching of the hook and latch members, wherein the latch is arranged to be flexible so as to release the latched device, the hook member being relatively rigid relative to the latch member, at least one edge including an elongate ridge capable of being received in a trough on an opposite peripheral edge, said ridge and trough assisting in the closing of the cavity halves, and at least one of the latch and the hook having an extension projecting beyond the latching portions of the hook and latch, by which exterior manual flexing may be effected to release the latched device.

2. The device according to claim 1 wherein the latch and hook members hinge about a plastic hinge between cavity halves.

3. The device according to claim 1 wherein the body is fabricated from a material selected from the group consisting of polypropylene, nylon, and polyetheylene.

4. The device according to claim 3 wherein the cavity halves are filled with a sealant material selected from the group consisting of a polyurethane gel, a silicone gel, a thermoplastic elastomer with plasticizing oil gel, or a polyurea gel.

5. The device according to claim 4 wherein the gel has a Voland hardness of from about 10 to about 40 grams and an ultimate elongation of at least about 100%.

6. The device according to claim 3 wherein the interior of the cavity halves includes a surface treatment selected from the group consisting of chemical etching, glow discharge etching, and a plurality of ribs molded therein to enhance the adhesion of the gel thereto.

7. The device according to claim 6 further including passages through opposite peripheral edges of the device to provide means for securing members to pass therethrough on the closure of the device.

8. The device according to claim 2 wherein the latch flexes about a plastic hinge and the device is molded plastic.

9. The environmental protection device according to claim 1 further including a second hingeable body having first and second cavity halves and a hook and latch mechanism on peripheral edges wherein the hook of the second body mates to the latch of the first body and the latch of the first body mates with the hook of the second body to seal parallel substrates passing therethrough within the mated cavity halves.

10. The device according to claim 9 further including two coaxial cable connectors spliced together across a coaxial cable splice and sealed within the cavity of the cavity halves.

11. In an environmental protection device for a substrate, the improvement which comprises:

a hook along an edge of the device and a latch and bracing member spaced apart from the latch by a gap along an opposite edge of the device, the gap being sized to accept the hook therethrough but not permit hook or latch flexing in the absence of an outside unlatching force acting on the latch, the device including upon closing a cavity therebetween, said hook and latch exhibiting a holding together force upon connecting which is greater than the force required to unlatch the hook and latch, said latch flexing towards a body of the device at least for unlatching, the cavity halves being filled with a sealant material selected from the group consisting of a polyurethane gel, a silicone get, a thermoplastic elastomer with plasticizing oil gel, or a polyurea gel wherein the gel has Voland hardness of from about 10 to about 50 grams and an ultimate elongation of at least about 100%, the device being molded plastic, and at least one edge including an elongate ridge capable of being received in a trough on an opposite peripheral edge, said ridge and trough assisting in the closing of the cavity halves.

12. The device according claim 11 wherein the latch flexes about a plastic hinge.

13. The device according to claim 11 wherein the cavity is formed from cavity halves, one cavity halve adjacent the hook and the other cavity halve adjacent the latch and bracing member, said cavity halves separated by a plastic hinge therebetween.

\* \* \* \* \*